Feb. 19, 1963 S. CARLONI 3,078,414
LINEAR SCALE READING A.C. AND D.C. METER
Filed March 6, 1959

INVENTOR.
Secondo Carloni
BY Richards & Geier
ATTORNEYS

United States Patent Office 3,078,414
Patented Feb. 19, 1963

3,078,414
LINEAR SCALE READING A.C. AND D.C. METER
Secondo Carloni, Via dei Gelsi 49, Rome, Italy
Filed Mar. 6, 1959, Ser. No. 797,691
Claims priority, application Italy Mar. 15, 1958
2 Claims. (Cl. 324—73)

It is a known fact that the dial faces of the galvanometers used in the conventional testers present several scales: one linear scale for the measurement of direct currents and voltages; one logarithmic scale for resistance measurements; and a third non-linear scale and in some cases a fourth scale, provide readings of alternating voltages.

The passage from the reading of one scale to another requires the changing of one and sometimes both connector tips of the test probes, and/or the operation of switches.

Under these circumstances it is understandable that it is possible, because of the several scales and of the required changes in tips and switch positions, to make errors in setting up the instruments and consequently in making the reading, particularly when the many readings must be made, as it usually happens, in the shortest possible time. It was found in practice that even skilled and intelligent operators can make mistakes of this kind, which often cause considerable damage.

To remedy in some way this difficulty, the builders have been using simple devices, such as the different coloration of scales and jack tips and appropriate warnings on the instrument case, but substantially the number of scales and their combinations, with the inconvenience of not having the negative tip common to all measurements, have remained unchanged.

The present invention is concerned with reducing the number of scales to two, and with abolishing lever and knob switches, using for all readings a single tip corresponding to the negative probe.

This is made possible by the adoption of a special circuit and by the special type of jacks mounted for all measurements, except for D.C. voltages for which conventional jacks are provided.

The operation of the said jacks is the following: when the tip of the positive probe is inserted, it contacts two central leaves which are forced outside and close two contacts, electrically independent, which connect the parts of the circuit required for the measurement involved.

Figure 1:
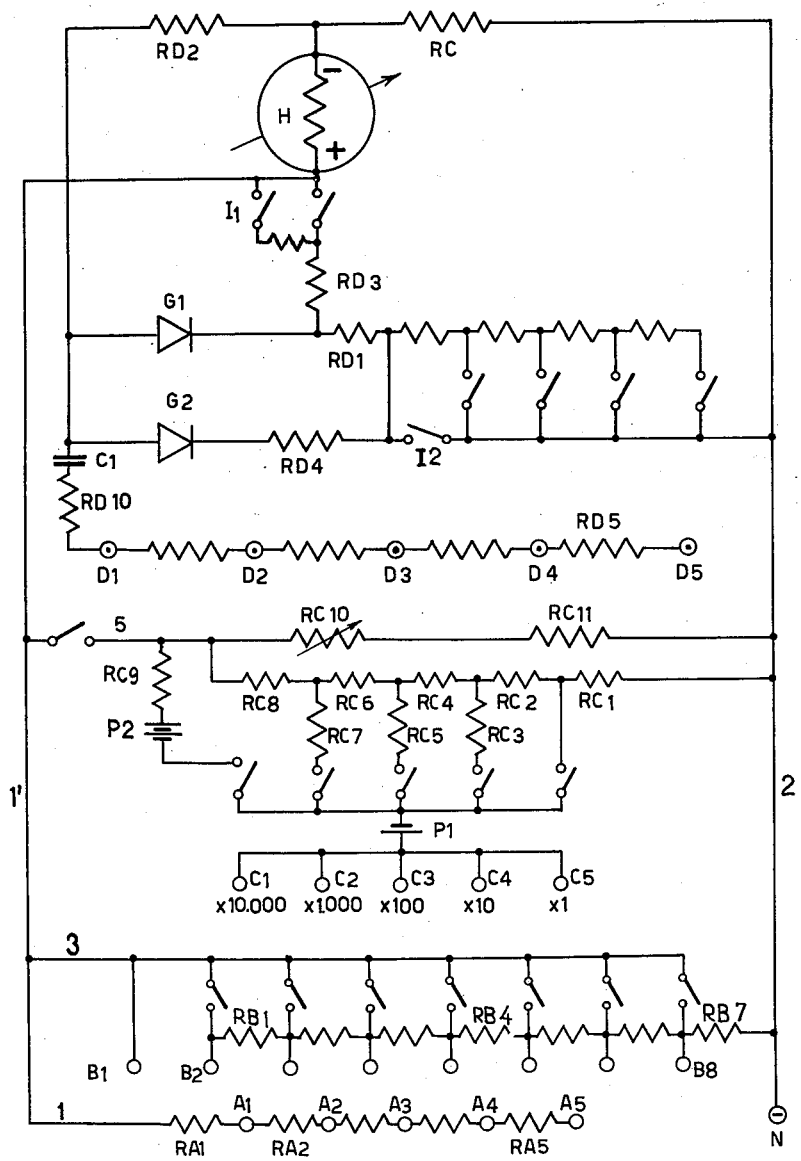
Figure 2:
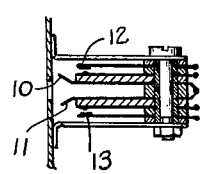

In the enclosed drawings, FIG. 1 shows the circuit of the tester according to the present invention, and FIG. 2 a view of the jack referred to above. This circuit comprises: a first series of conventional jacks A1 . . . A5 wired in series through the resistors RA1 . . . RA5 which, being connected to the positive terminal of the galvanometer by wire 1, and to jack N through resistor RC to the negative terminal of the galvanometer, form the circuit for the measurement of D.C. voltages of end-of-scale values of 2.5, 10, 50, 250 and 1000 volts and an impedance of 20,000 ohms volts. A second series of jacks B1 . . . B8 connected in series with the interposition of resistors RB1 . . . RB7, is provided for the reading of D.C. currents of end-of-scale values of .00005, .00025, .001, .01, .05, .25, 1 and 10 amperes.

The operation takes place by inserting the tip corresponding to the positive probe in the jack marked for the desired value, which will automatically close the circuit on the galvanometer, which will be shunted with the appropriate resistance value.

A third series of jacks C1 . . . C5, together with resistors RC1 . . . RC10 with auxiliary power sources in the form of dry cells (P1 of 1.5 volts and P2 of 6 volts), make it possible to measure resistances by multiplying the value read on the galvanometer scale by coefficients of 1, 10, 100, 1000, and 10,000. The resistor RC10 is variable and can be adjusted to allow for changes in dry cell voltage. The center-scale value of the galvanometer is 10.

A fourth series of jacks D1—D6, with the resistors RD1—RD10, condenser C1 and the two germanium rectifiers G1 and G2, make it possible to read alternating voltages on the same scale used for direct currents and voltages, with end-of-scale values of 5, 10, 25, 50, 250 and 1,000 volts, impedance of 2,000 ohms/volts and frequencies up to 100,000 c.p.s.

The operation of this circuit is the following: the alternating voltage to be measured, through resistors RD5 . . . RD10 and D.C.-blocking condenser C1, is sent to a special bridge circuit formed on three sides by normal resistors RD1, RD2 and RC, and on the fourth by a germanium rectifier G1.

Across the diagonal of the bridge is connected D.C. galvanometer H, in series with resistor RD3 which makes it possible to adjust end-of-scale readings. This results is improved linearity of the reading scale, having abolished on three of the four sides of the bridge the rectifier elements, which are the principal cause of the non-linearity of the readings in all testers now used.

A second germanium rectifier G2 is used to achieve a further improvement in the linearity of the reading scale.

As already stated, all of the above-described jacks with the exception of conventional jacks which are used for D.C. voltages, are of the type shown in FIGURE 2 having two central leaves 10 and 11 which may be forced outwardly by the tip of the probe to close the two separate pairs of contacts 12 and 13.

Its operation is the following: being connected with a suitable series resistor RD4 in parallel with the bridge, it will act as a resistor variable with the reading voltage, providing a high resistance for low readings, which will gradually decrease with the increase in voltage.

Let us assume that we want to measure the alternating voltage present in a circuit. We insert one tip into jack N and the other into the jack of the D series which corresponds to the voltage immediately higher than that supposed to be present in the circuit to be measured, this jack being for instance D4. Jack D4 will close switches $J_1$ and $J_2$, and the voltage will be read on the same scale used for D.C. voltages.

What I claim is:
1. A universal tester for radio and electric equipment, comprising, in combination with a direct current galvanometer having a single scale for reading direct currents and voltages as well as alternating voltages; a single negative probe contact, a resistor connected to one terminal of said galvanometer, a conduit connecting said contact to said resistor, a first series of jacks, the jacks of said first series being interconnected in series, another conduit connecting said first series of jacks to the other terminal of said galvanometer, a second series of jacks for measuring direct currents, the jacks of said second series being interconnected in series, said second series of jacks being connected to said conduits, a third series of jacks for measuring ohmic resistances, the jacks of said third series being interconnected in series, two dry cells interconnected in series, one of said dry cells being connected to one of said jacks of the third series, resistances connecting said one dry cell to the first-mentioned conduit, resistances connecting the second dry cell to said conduits, a fourth series of jacks for measuring alternating voltages, the jacks of said fourth series being interconnected in series, a resistor connected with said jacks of the fourth series, a condenser connected to the last-mentioned resistor, two rectifiers connected to said condenser, a plurality of resistors interconnected in par- allel and connected to said rectifiers and the first-mentioned conduit, and means connecting one of said rectifiers to the other terminal of said galvanometer, each of the jacks of the second, third and fourth series being a double jack adapted to close two circuits.

2. A universal tester for radio and electric equipment, comprising, in combination with a direct current galvanometer having a single scale for reading direct currents and voltages as well as alternating voltages; a single negative probe contact, a resistor connected to one terminal of said galvanometer, another resistor connected to said one terminal of the galvanometer, a third resistor connected with the other terminal of said galvanometer, a germanium rectifier connected with the third resistor and said other resistor, a plurality of further resistors interconnected in series and connected to said third resistor, said rectifier and the first-mentioned resistor, whereby the first-mentioned resistor, said other resistor, said plurality of further resistors and said rectifier form four sides of a bridge connection and whereby said galvanometer and said third resistor form the diagonal of said bridge connection, a conduit connecting said contact to the first-mentioned resistor and said plurality of further resistors, a first series of jacks, the jacks of said first series being interconnected in series, another conduit connecting said first series of jacks to the other terminal of said galvanometer, a second series of jacks for measuring direct currents, the jacks of said second series being interconnected in series, said second series of jacks being connected to said conduits, a third series of jacks for measuring ohmic resistances, the jacks of said third series being interconnected in series, two dry cells interconnected in series, one of said dry cells being connected to one of said jacks of the third series, resistances connecting said one dry cell to the first-mentioned conduit, resistances connecting the second dry cell to said conduits, a fourth series of jacks for measuring alternating voltages, the jacks of said fourth series being interconnected in series, a resistor connected with said jacks of the fourth series, a condenser connected to the last-mentioned resistor, said rectifier being connected to said condenser, another germanium rectifier connected to said condenser, and yet another resistor connected in series with the second-mentioned rectifier and connected to said plurality of further resistors.

References Cited in the file of this patent

UNITED STATES PATENTS

| | | |
|---|---|---|
| 2,511,562 | Bresee | June 13, 1950 |
| 2,550,787 | Dedman | May 1, 1951 |
| 2,552,981 | Lamb | May 15, 1951 |

FOREIGN PATENTS

| | | |
|---|---|---|
| 947,056 | France | Jan. 3, 1949 |